(12) United States Patent
Zhan et al.

(10) Patent No.: US 10,691,946 B2
(45) Date of Patent: Jun. 23, 2020

(54) INFORMATION DISPLAY METHOD, DEVICE, AND SYSTEM

(71) Applicant: Alibaba Group Holding Limited, George Town (KY)

(72) Inventors: Yongsheng Zhan, Hangzhou (CN); Feng Lin, Hangzhou (CN); Lei Cao, Hangzhou (CN); Xiao Chao, Hangzhou (CN); Ping Ruan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/142,851

(22) Filed: Sep. 26, 2018

(65) Prior Publication Data
US 2019/0026559 A1      Jan. 24, 2019

Related U.S. Application Data

(63) Continuation of application No. PCT/CN2017/077400, filed on Mar. 20, 2017.

(30) Foreign Application Priority Data

Mar. 29, 2016   (CN) .......................... 2016 1 0186690

(51) Int. Cl.
*G06K 9/00* (2006.01)
*G06F 16/432* (2019.01)
(Continued)

(52) U.S. Cl.
CPC .......... *G06K 9/00671* (2013.01); *G06F 3/011* (2013.01); *G06F 3/147* (2013.01);
(Continued)

(58) Field of Classification Search
CPC ... G06T 11/60; G06T 19/006; G06K 9/00671; G06K 9/00369; G06K 9/00885;
(Continued)

(56) References Cited

U.S. PATENT DOCUMENTS 10,423,656 B2 * 9/2019 Barak ................. G06F 16/3322
2012/0249797 A1   10/2012 Haddick et al.
(Continued)

FOREIGN PATENT DOCUMENTS

CN       101520731        9/2009
CN       102567617        7/2012
(Continued)

OTHER PUBLICATIONS

International Search Report by the International Searching Authority issued in International Application No. PCT/CN2017/077400 dated Jul. 10, 2017; 8 pages.
(Continued)

*Primary Examiner* — Chante E Harrison
(74) *Attorney, Agent, or Firm* — Fish & Richardson P.C.

(57) ABSTRACT

The present disclosure describes techniques for identifying images of users in visual media data. One example method includes receiving visual media data from a client device, wherein the visual media data was captured in real time by the client device; detecting a presence of an image of a human in the visual media data; determining a user identification associated with the human based on the detected presence of the image of the human in the visual media data; retrieving data corresponding to the user based on the user identification; generating user graphics data based on the retrieved data corresponding to the user; and transmitting the user graphics data to the client device, wherein the client device is configured to display the user graphics data with the visual media data.

18 Claims, 13 Drawing Sheets

(51) Int. Cl.

| | |
|---|---|
| *G06F 16/738* | (2019.01) |
| *G06F 16/535* | (2019.01) |
| *G06F 16/435* | (2019.01) |
| *G06F 16/538* | (2019.01) |
| *G06F 16/732* | (2019.01) |
| *G06F 16/532* | (2019.01) |
| *G06F 16/735* | (2019.01) |
| *G06T 19/00* | (2011.01) |
| *G06T 11/60* | (2006.01) |
| *G09G 5/377* | (2006.01) |
| *G06F 3/01* | (2006.01) |
| *G06F 16/438* | (2019.01) |
| *G06F 3/147* | (2006.01) |

(52) U.S. Cl.
CPC .......... *G06F 16/434* (2019.01); *G06F 16/436* (2019.01); *G06F 16/438* (2019.01); *G06F 16/532* (2019.01); *G06F 16/535* (2019.01); *G06F 16/538* (2019.01); *G06F 16/735* (2019.01); *G06F 16/738* (2019.01); *G06F 16/7335* (2019.01); *G06K 9/00369* (2013.01); *G06K 9/00885* (2013.01); *G06K 9/00892* (2013.01); *G06T 11/60* (2013.01); *G06T 19/006* (2013.01); *G09G 5/377* (2013.01); *G09G 2370/022* (2013.01)

(58) Field of Classification Search
CPC . G06K 9/00892; G06F 17/3005; G06F 3/011; G06F 3/147; G06F 3/0481; G06F 16/00; G06F 16/434; G06F 16/436; G06F 16/438; G06F 16/532; G06F 16/535; G06F 16/538; G06F 16/735; G06F 16/738; G06F 16/7335; G09G 5/377; G09G 2370/022
See application file for complete search history.

(56) References Cited

U.S. PATENT DOCUMENTS

| | | | | |
|---|---|---|---|---|
| 2013/0262588 | A1* | 10/2013 | Barak | H04L 67/22 709/204 |
| 2014/0055488 | A1* | 2/2014 | Masters | G06F 3/147 345/633 |
| 2014/0368538 | A1* | 12/2014 | Ratcliff | G06Q 50/10 345/633 |
| 2016/0335808 | A1* | 11/2016 | Novak | G06T 19/006 |
| 2018/0139203 | A1* | 5/2018 | Dolan | H04L 63/0861 |
| 2018/0165849 | A1* | 6/2018 | Johansen | G06T 11/60 |
| 2019/0370590 | A1* | 12/2019 | Sun | G06T 19/006 |

FOREIGN PATENT DOCUMENTS

| | | |
|---|---|---|
| CN | 102981761 | 3/2013 |
| CN | 103294779 | 9/2013 |
| CN | 103412953 | 11/2013 |
| CN | 103577516 | 2/2014 |
| CN | 103970804 | 8/2014 |
| CN | 102087738 | 8/2015 |
| CN | 105338117 | 2/2016 |
| CN | 105354334 | 2/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Extended European Search Report in European Application No. 17773090.0, dated Sep. 5, 2019, 8 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/077400, dated Oct. 2, 2018, 10 pages (with English translation).

PCT Written Opinion of the International Searching Authority in International Application No. PCT/CN2017/077400, dated Jul. 10, 2017, 9 pages (with English translation).

* cited by examiner

INFORMATION DISPLAY METHOD, DEVICE, AND SYSTEM

CROSS-REFERENCE TO RELATED APPLICATIONS

This application is a continuation of PCT Application No. PCT/CN2017/077400, filed on Mar. 20, 2017, which claims priority to Chinese Patent Application No. 201610186690.3, filed on Mar. 29, 2016, and each application is hereby incorporated by reference in its entirety.

TECHNICAL FIELD

The present application relates to the field of computer technologies, and in particular, to information display methods and devices, and an information display system.

BACKGROUND

With the support of the Internet and intelligent technologies, online systems (e.g., websites) are transformed from conventional systems providing undiversified services to users to comprehensive network platforms. Through the online system, the users not only can interact with a back-end server of the online system, but also implement operations such as service interaction and information sharing with other users who use the online system.

In the existing technology, when users interact with each other based on an online system, any user (which is referred to as "first user" for simplicity) who uses the online system can view user information of another user (which is referred to as "second user" for simplicity), for example, account name, comments to the second user made by different users, self-introduction, or user tag, so that the first user identifies the second user who the first user needs to perform interaction operations, such as information sharing, service acquisition, and following the user.

However, the method in the existing technology still has the following defects:

First, if the first user wants to learn of the user information of the second user, the first user can access a corresponding page (e.g., a homepage of the second user) only by using an end device. This method is complicated.

Second, the user information of the second user, viewed by using the previously described method, is only information that the second user registers with the online system. In other words, the user information viewed by the first user is virtual network information, and the second user cannot be determined in an actual environment by using such virtual network information. Considering current offline services tend to be moved to an online network, if a user can determine an actual user by viewing user information of the user, the users can interact with each other more easily. However, the method in the existing technology is difficult to implement a mapping relationship between virtual information and an actual user.

SUMMARY

Implementations of the present application provide information display methods and devices, and an information display system, to resolve problems when users interact with each other.

An implementation of the present application provides an information display method, including: receiving an image that is captured in real time and sent by an end device; determining a user image included in the image; determining a user identifier corresponding to the user image; obtaining user information corresponding to the determined user identifier based on a pre-stored mapping relationship between a user identifier and user information; and generating augmented reality (AR) graphics data corresponding to the user information based on the obtained user information, and returning the AR graphics data to the end device, so that the end device displays, based on the received AR graphics data, corresponding AR graphics in the image that is captured in real time, where the AR graphics follow the user image in real time.

An implementation of the present application further provides an information display method, including: capturing an image in real time, and sending the image to a server, where the image includes a user image, so that the server determines the user image included in the image, determines a user identifier corresponding to the user image, obtains user information corresponding to the determined user identifier based on a pre-stored mapping relationship between a user identifier and user information, generates AR graphics data corresponding to the user information based on the obtained user information, and returns the AR graphics data to an end device; receiving the AR graphics data that corresponds to the user information and that is returned by the server; and displaying, based on the AR graphics data, corresponding AR graphics in the image that is captured in real time, where the AR graphics follow the user image in real time.

An implementation of the present application further provides an information display device, including: a receiving module, configured to receive an image that is captured in real time and sent by an end device; a user image module, configured to determine a user image included in the image; a user identifier module, configured to determine a user identifier corresponding to the user image; a user information module, configured to obtain user information corresponding to the determined user identifier based on a pre-stored mapping relationship between a user identifier and user information; and an AR module, configured to generate AR graphics data corresponding to the user information based on the obtained user information, and return the AR graphics data to the end device, so that the end device displays, based on the received AR graphics data, corresponding AR graphics in the image that is captured in real time, where the AR graphics follow the user image in real time.

An implementation of the present application further provides an information display device, including: a capturing module, configured to capture an image in real time, and send the image to a server, where the image includes a user image, so that the server determines the user image included in the image, determines a user identifier corresponding to the user image, obtains user information corresponding to the determined user identifier based on a pre-stored mapping relationship between a user identifier and user information, generates AR graphics data corresponding to the user information based on the obtained user information, and returns the AR graphics data to an end device; a receiving module, configured to receive the AR graphics data that corresponds to the user information and that is returned by the server; and a display module, configured to display, based on the AR graphics data, corresponding AR graphics in the image that is captured in real time, where the AR graphics follow the user image in real time.

An implementation of the present application further provides an information display system, including: an end device, configured to capture an image in real time, send the image to an information display device, and display, based on received AR graphics data that corresponds to a user image included in the image and that is returned by the information display device, corresponding AR graphics in the image that is captured in real time, where the AR graphics follow the user image in real time; and the information display device, including: an AR intelligent module, configured to receive the image that is captured by the end device in real time, and generate the AR graphics data corresponding to user information included in the image; a recognition and verification module, configured to determine the user image included in the image based on the received image, and determine a user identifier corresponding to the user image; a tag management module, configured to obtain the user information corresponding to the determined user identifier based on a pre-stored mapping relationship between a user identifier and user information; a big data risk control module, configured to obtain historical data corresponding to the user identifier, determine a matching degree between the user information in a mapping relationship that is to be established and the historical data based on the historical data, use the matching degree as first reliability of the user information in the mapping relationship that is to be established, store the first reliability of the user information in the mapping relationship that is to be established, and establish the mapping relationship between the user information in the mapping relationship that is to be established and the user identifier in the mapping relationship that is to be established; and a mutual authentication module, configured to determine, for each piece of stored user information, other users who perform a specified operation on the user information, determine, for each of the other users based on a level of the user, a score generated by the specified operation that is performed on the user information by the user, and determine and store second reliability of the user information based on the score determined for each of the other users.

The implementations of the present application provide the information display methods and devices, and the information display system. In the method, the end device sends the image that is captured in real time to the server. In this case, the server recognizes a character image (the user image) included in the image, further determines an identity and the user information of the user, then generates the AR graphics data corresponding to the user information, and returns the AR graphics data to the end device, so that the end device can display the AR graphics corresponding to the user image in the image. The AR graphics reflect the user information of the user. Different from the existing technology, in the method of the implementations of the present application, a user can view user information of other users without accessing a corresponding interface. In addition, virtual user information can be associated with an actual user by using AR graphics, and the user can view user information of other users without any operation in the whole process. In this method, the user information can be viewed more conveniently during user interaction, and a substantial association between virtual user information and an actual user is established.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation on the present application. In the accompanying drawings.

DESCRIPTION OF IMPLEMENTATIONS

To make the objectives, technical solutions, and advantages of the present application clearer, the following clearly describes the technical solutions of the present application with reference to the specific implementations and the corresponding accompanying drawings of the present application. Apparently, the described implementations are some rather than all of the implementations of the present application. All other implementations obtained by a person of ordinary skill in the art based on the implementations of the present application without creative efforts shall fall within the protection scope of the present application.

As described above, when users interact with each other, if a first user can learn of user information of a second user (e.g., information such as a user tag and credit of the second user, and comments to the second user), the first user can preliminarily know the second user by using the user information, so that the users can interact with each other more easily. However, in this case, the first user can access a corresponding interface only by using an end device, to view the user information of the second user. In addition, if the first user wants to perform offline interaction with the second user, because the user information is virtual information, the first user cannot determine the second user by using the user information of the second user.

Therefore, an information display method that user information can be conveniently displayed and the displayed user information can reflect a mapping relationship between the user information and a user is needed. In view of this, an implementation of the present application provides an information display method, as shown in FIG. 1.

Figure 1:
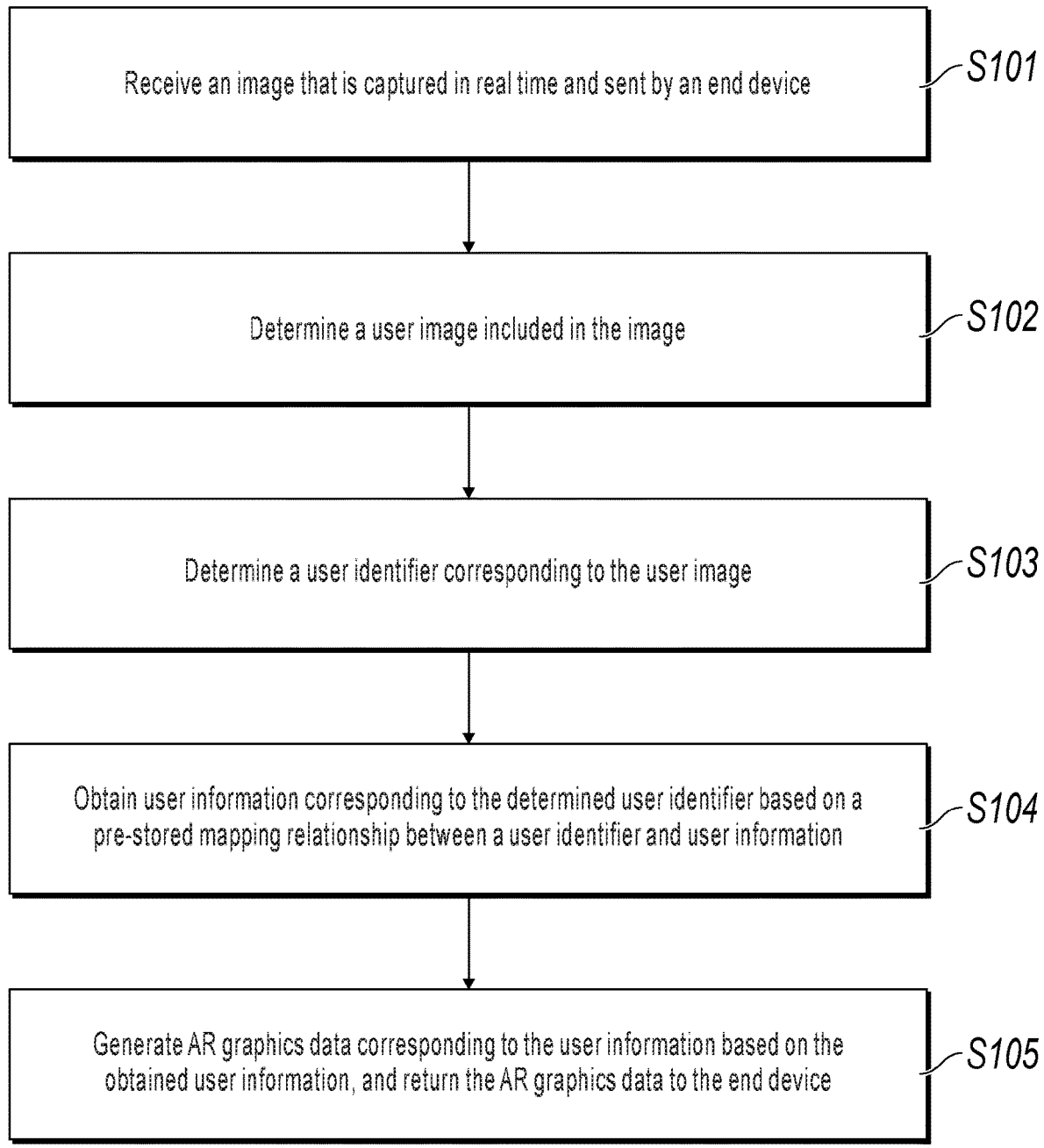
FIG. 1 is a flowchart illustrating an information display process, according to an implementation of the present application.

FIG. 1 is a flowchart illustrating an information display process, according to an implementation of the present application, and the process specifically includes the following steps.

S101: Receive an image that is captured in real time and sent by an end device.

In this implementation of the present application, the end device includes an augmented reality (AR) device (the AR device in the present application has an image capture function). The AR device includes but is not limited to AR glasses, an AR helmet, a mobile phone with an AR function, a computer with an AR function, and a robot with an AR function (the robot in the present application is a physical robot that has a capture and display function).

In some implementations of the present application, in a capture process, the end device can be a device with an image capture function that is configured to capture an image in real time, for example, a mobile phone, a camera, a computer equipped with a camera, or a robot. A capture method can be taking a photo.

The image captured by the end device in real time can be a real-scene image (the real-scene image is an image captured in the natural world).

S102: Determine a user image included in the image.

In this implementation of the present application, the user image can be a character image of a user. When the end device captures the real-scene image in real time, the user is in a real scene, and therefore the image captured by the end device includes the user image.

For example, assume that the image captured by the end device is a real-scene image of an office, an employee image included in the image is the user image.

Determine the user image in the image, which is performing character recognition on the image. In this implementation of the present application, the user image included in the image can be determined by using different character recognition methods. This constitutes no limitation on the present application here.

S103: Determine a user identifier corresponding to the user image.

After the user image in the image is determined, a user corresponding to the user image can be further determined. In other words, feature recognition (e.g., biometric feature recognition such as facial recognition and gait recognition) is performed on the user image, to determine an identity of the user corresponding to the user image.

In view of this, the user identifier can be an identity (e.g., an ID of a user) that is used to identify a user. In a method of this implementation of the present application, the user identifier can be stored in an online system, and the user enters a biometric feature of the user into the online system in advance, so that the online system can establish a mapping relationship between a biometric feature of each user and a user identifier. After the biometric feature of the user is recognized, the user identifier of the user can be determined based on the mapping relationship (the user identity is determined).

S104: Obtain user information corresponding to the determined user identifier based on a pre-stored mapping relationship between a user identifier and user information.

The user information includes but is not limited to a real name of the user, an account name, a self-introduction, comments to the user made by other users, a user tag (the user tag can be a tag that can reflect some attributes of the user, for example, "movie expert" or "gold member"), etc.

In the online system, a mapping relationship between a user identifier and user information of each user is established. As such, once the user identifier corresponding to the user image is determined, the user information corresponding to the user identifier can be further determined.

S105: Generate AR graphics data corresponding to the user information based on the obtained user information, and return the AR graphics data to the end device, so that the end device displays, based on the received AR graphics data, corresponding AR graphics in the image that is captured in real time.

The AR graphics follow the user image in real time.

The AR graphics corresponding to the user information can be graphics such as a text and an icon that are displayed in a two-dimensional or three-dimensional form. This is not limited here. In other words, in this implementation of the present application, corresponding graphics processing is performed on the user information to form the AR graphics of the user information. As such, the end device not only displays the captured real-scene image, but also displays the corresponding AR graphics of the user information above the user image in the real-scene image.

Figure 2A:
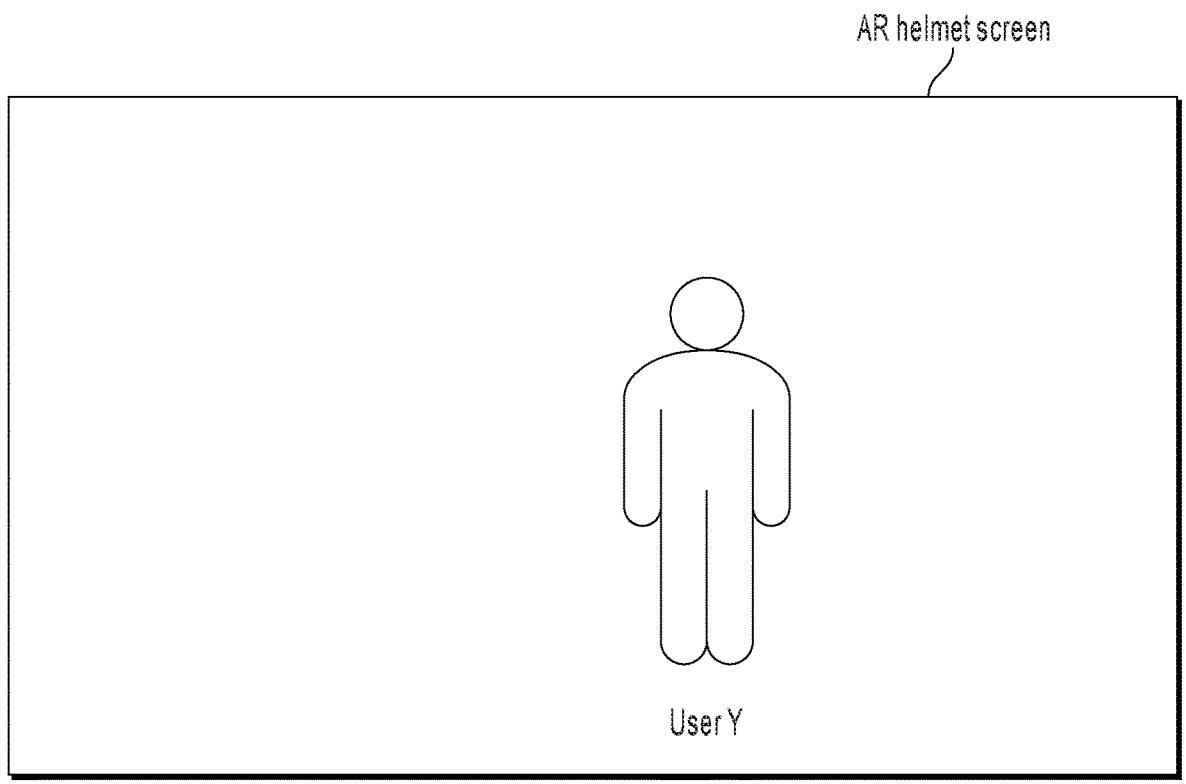
FIG. 2a is a schematic diagram illustrating an AR helmet screen that does not display AR graphics, according to an implementation of the present application.

For example, assume that the end device is an AR helmet. FIG. 2a shows a real-scene image captured by the AR helmet. Assume that the real-scene image includes a character image (a user image) of user Y. Based on the method described above, a corresponding online system can determine that a user corresponding to the user image is user Y (user Y has a user tag "movie expert"). Then, the online system generates AR graphics data for the user tag "movie expert", and sends the AR graphics data to the AR helmet. The AR helmet displays AR graphics of the user tag "movie expert" above the character image of user Y, as shown in FIG. 2b.

In actual applications, a person in an actual environment can move anytime, or the AR device can move with a user using the AR device (e.g., if the user using the AR device turns his head or walks, a shooting angle or location of the AR device changes accordingly). In these cases, a location of a captured user image can change. In view of this, the AR graphics in this implementation of the present application follow the user image in real time, so that an association between the AR graphics and the user image can be explicit.

Figure 2B:
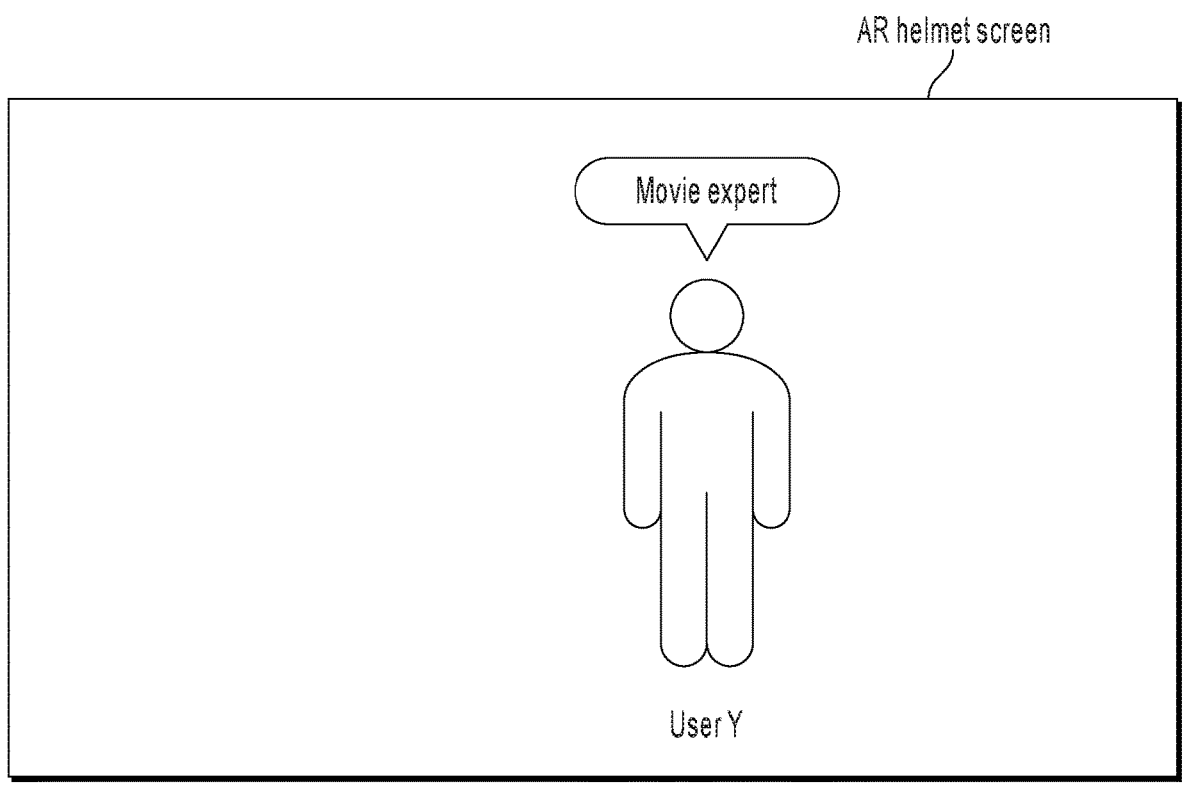
FIG. 2b to FIG. 2d are schematic diagrams illustrating an AR helmet screen that displays AR graphics, according to an implementation of the present application.
Figure 2C:
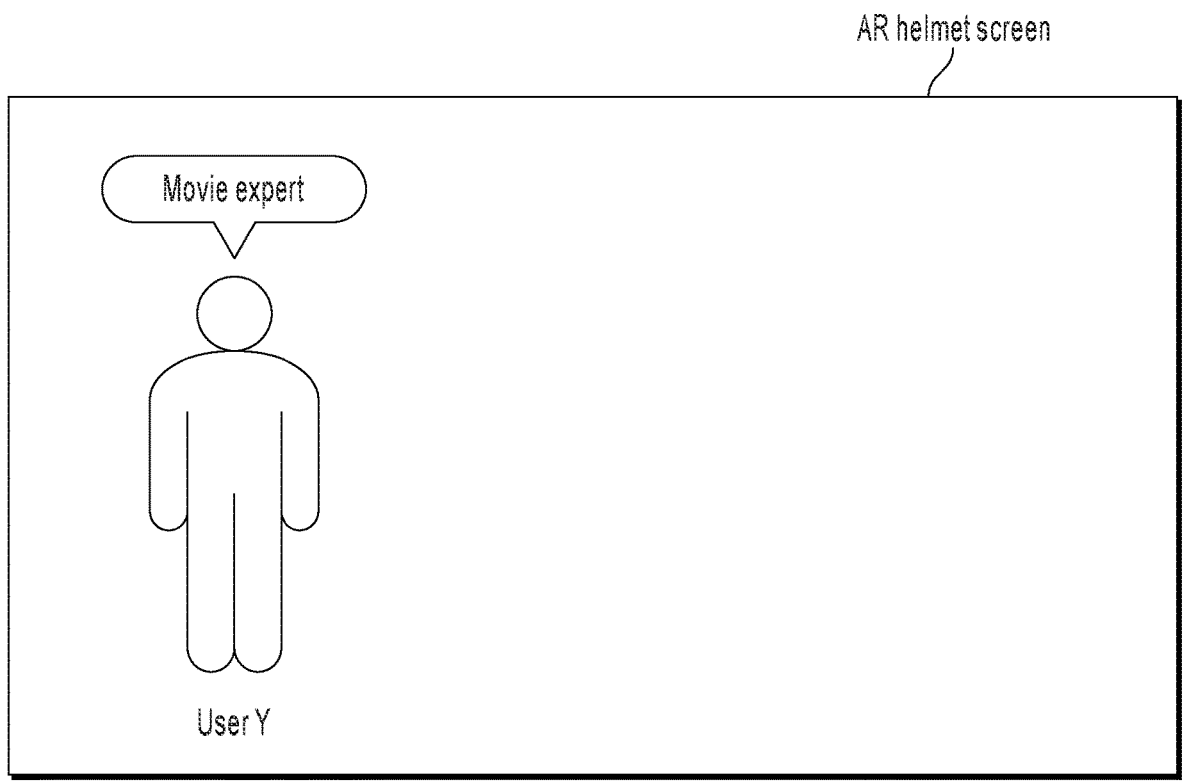

Continuing with the previous example, assume that user Y moves to the left side of the image in FIG. 2b, the AR graphics of the user tag "movie expert" of user Y moves with user Y, as shown in FIG. 2c.

Figure 2D:
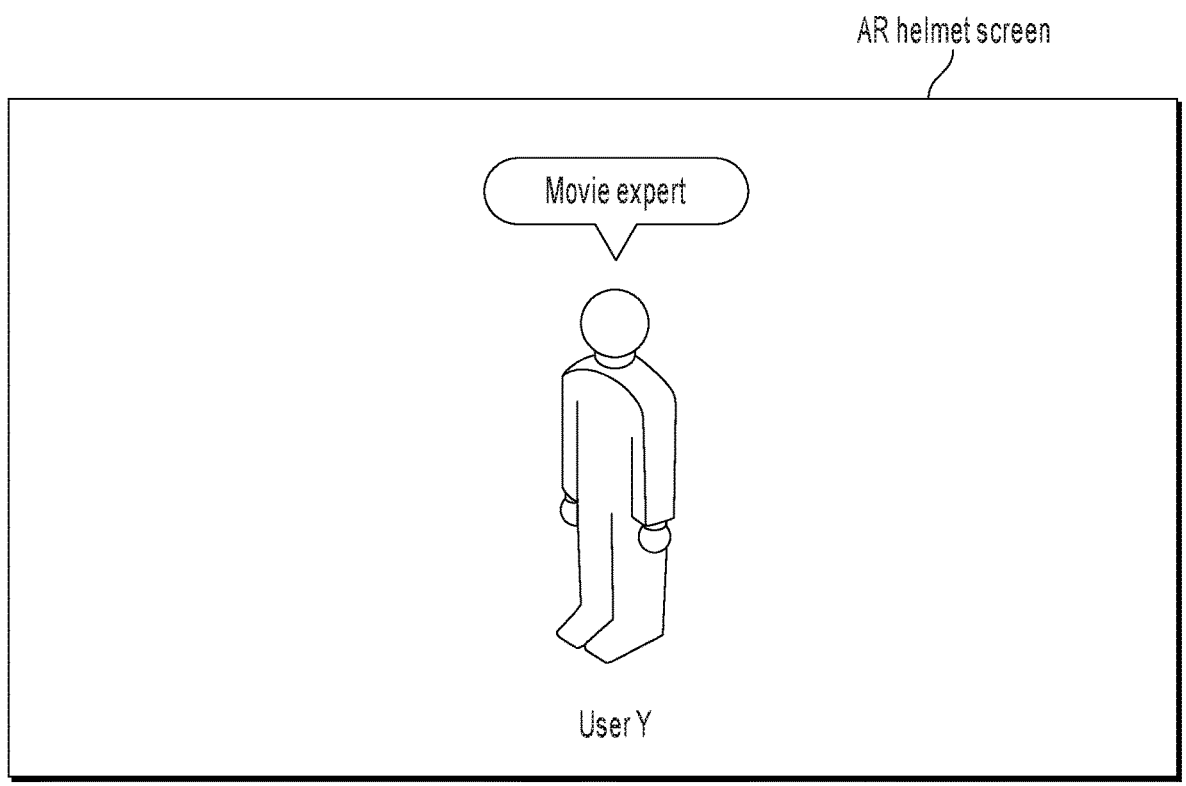

In the previous examples, only a two-dimensional view is used for illustration. In actual applications, real-scene images viewed by users through AR devices are all three-dimensional, and relative movement between the users is more complicated. For example, if a user holding an AR device moves to a side of a user corresponding to a captured image, AR graphics are always displayed from an angle of an observer. For example, continuing with the previous example, as shown in FIG. 2d, a user using the AR helmet moves to a front-left side of user Y, and the AR graphics of the user tag "movie expert" is displayed from an angle of an observer (in other words, the AR graphics of the user tag always face the user using the AR helmet). In this implementation of the present application, a display location, a direction, etc. of the AR graphics can be determined based on parameters (e.g., a translation parameter, a deflection parameter, and a focal length) of the AR device. This constitutes no limitation on the present application here.

In a method of this implementation of the present application, the AR graphics data can be easily transmitted data converted from the AR graphics after the online system constructs the AR graphics. In this method, after receiving the AR graphics data, the end device can directly display the corresponding AR graphics.

In another method of this implementation of the present application, the AR graphics data can be data generated by the online system for constructing the AR graphics. In this method, after receiving the AR graphics data, the end device locally constructs the AR graphics based on the AR graphics data, and then displays the AR graphics.

The previously described two methods constitute no limitation on the present application.

In addition, the end device can display the AR graphics in different ways based on different devices. For example, when the AR device is a wearable device such as AR glasses or an AR helmet, the AR graphics are directly displayed on lens of the glasses or a screen of the helmet. When the AR device is a computer or a robot with an AR function, the AR graphics can be displayed on a corresponding screen or can be displayed through projection (including planar projection and holographic projection). This is not limited here.

It is worthwhile to note for the content described above, a back-end server (or a server cluster) of the online system can perform operations such as receiving and recognizing an image and generating AR graphics data. The server and the end device keep connected to each other via a network during application.

Based on the previously described steps, the end device sends the image that is captured in real time to the server. In this case, the server recognizes the character image (the user image) included in the image, further determines the identity and the user information of the user, then generates the AR graphics data corresponding to the user information, and returns the AR graphics data to the end device, so that the end device can display the AR graphics corresponding to the user image in the image. The AR graphics reflect the user information of the user. Different from the existing technology, in the method of this implementation of the present application, a user can view user information of other users without accessing a corresponding interface. In addition, virtual user information can be associated with an actual user by using AR graphics, and the user can view user information of other users without any operation in the whole process. In this method, the user information can be viewed more conveniently during user interaction, and a substantial association between virtual user information and an actual user is established.

Figure 3:
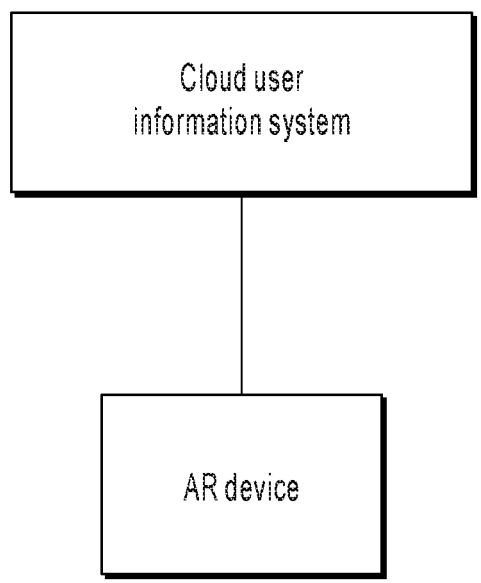
FIG. 3 is a schematic architectural diagram illustrating a cloud user information system and an end device, according to an implementation of the present application.

It is worthwhile to note the content described in this implementation of the present application (including the method shown in FIG. 1 and subsequent content) can be based on a structure shown in FIG. 3. Specifically, FIG. 3 includes a cloud user information system and an AR device. The cloud user information system is used to recognize a user image in an image sent by the AR device, and a user identity, and generate AR graphics data. The AR device is configured to capture the image, and display the image and AR graphics corresponding to the AR graphics data.

Determining of the user identity affects accuracy of subsequent determining of user information. If the user identity cannot be accurately determined, subsequently generated AR graphics cannot reflect real user information of the user. Therefore, this implementation of the present application provides different methods for recognizing a user identity.

Specifically, in actual applications, a server stores biometric features of different users, and therefore a user identifier corresponding to a user image can be determined.

Specifically, the determining a user identifier corresponding to a user image includes the following: extracting an image feature based on the determined user image; determining a user feature that matches the extracted image feature from pre-stored user features that respectively correspond to user identifiers; and using a user identifier corresponding to the determined user feature as the user identifier corresponding to the user image.

The image feature is extracted for the user image in the image. In this implementation of the present application, the image feature can be a facial feature, an iris feature, a body feature, etc. that are extracted from the user image.

The pre-stored user features include a biometric feature. In this implementation of the present application, the biometric feature includes but is not limited to a facial feature, a fingerprint feature, a palm print feature, a retinal feature, a human outline feature, a gait feature, a voiceprint feature, etc.

In actual applications, the image captured by the end device can be one frame of image or multiple consecutive frames of images (video). In the two cases, different image features are extracted. Correspondingly, different recognition methods are needed to recognize the image features. Details are as follows.

First, the image captured by the end device is one frame of image.

One frame of image can be considered as a static image. In this case, the image features extracted for a character in the image can be some static features, for example, a facial feature, a human outline feature, a fingerprint feature, a palm print feature, and an iris feature.

In different application scenarios, different image features can be extracted from the user image. For example, if a face in the user image captured by the end device is clear, the facial feature can be extracted. For another example, if a camera of the end device is associated with a fingerprint collector or a palm print collector, the fingerprint or palm print feature of the user can be extracted. In a method of this implementation of the present application, in actual applications, multiple image features can be extracted, to improve accuracy of a subsequent recognition process. This constitutes no limitation on the present application here.

In addition, a corresponding feature extraction algorithm can be used to extract the image feature, for example, a feature-based recognition algorithm or a template-based recognition algorithm. This is not limited here. After the image features of the character are extracted, recognition can be performed on the image features based on the pre-stored biometric feature.

Second, the image captured by the end device is multiple consecutive frames of images.

Multiple consecutive frames of images can be considered as a continuous and dynamic video. In this case, the image features extracted for a character in the image can include external features (e.g., a human outline feature and a facial feature) of the character, and some dynamic features such as a gait feature.

In a method of this implementation of the present application, when the image captured by the end device is clear enough, facial features of the character in the multiple frames of images can be determined from different angles, to construct a facial model of the character.

Specifically, when the biometric feature includes the facial feature, the receiving an image that is captured in real time and sent by an end device includes the following: receiving the multiple frames of images that are captured in real time and sent by the end device.

In view of this, the determining a user feature that matches the extracted image feature from pre-stored user features that respectively correspond to user identifiers specifically includes the following: extracting a facial feature from a user image in each frame of image, constructing a three-dimensional facial model based on the extracted facial features, and determining a three-dimensional facial model that matches the constructed three-dimensional facial model from pre-stored three-dimensional facial models that respectively correspond to user identifiers.

It is worthwhile to note the server constructs a three-dimensional facial model for each user in advance. To be specific, the server can perform multi-angle scanning on a user's face such as a front face and a side face, and then construct the three-dimensional facial model based on diagrams of the face that are obtained through multi-angle scanning. This constitutes no limitation on the present application here.

Based on this method, the user identity can be accurately determined, and the user identifier of the user can be accurately determined.

In another method of this implementation of the present application, because different users have different walking postures and habits, the user identity can be recognized through a gait feature of the user, and the gait feature of the user can be determined from the multiple consecutive frames of images. Details are as follows.

When the biometric feature includes the gait feature, the receiving an image that is captured in real time and sent by an end device specifically includes the following: receiving the multiple frames of images that are captured in real time and sent by the end device.

In view of this, the determining a user feature that matches the extracted image feature from pre-stored user features that respectively correspond to user identifiers specifically includes the following: extracting a gait feature from a user image in each frame of image, and determining a gait feature that matches the extracted gait feature from pre-stored gait features that respectively correspond to user identifiers.

In another method of this implementation of the present application, some end devices have an audio collection function. If a user talks, the user's voice is collected by the end device, and the end device sends collected user's voice data to a corresponding server.

Therefore, the server can perform acoustic processing such as filtering and noise reduction on the voice data sent by the end device, further extract a voiceprint feature of the user, and match the voiceprint feature with a pre-stored voiceprint feature, to determine a user identifier corresponding to the voiceprint, that is, to recognize a user identity.

Certainly, in an actual process of recognizing the user identity, the previously described methods can be used in combination to accurately determine the user identity.

The process of recognizing the user identity, that is, determining the user identifier corresponding to the user image, is described above. After the user identifier is determined, the corresponding user information can be obtained for subsequently generating the AR graphics data.

The user information in this implementation of the present application can be edited by the user or edited by another user for the user.

Therefore, the pre-storing a mapping relationship between a user identifier and user information specifically includes the following: receiving user information edited by a user for a user identifier of the user, and establishing and storing a mapping relationship between the user identifier and the user information based on the user information edited by the user for the user identifier of the user; or receiving user information edited by a first user for a second user, and establishing and storing a mapping relationship between a user identifier of the second user and the user information based on the user information edited by the first user for the second user.

For example, the user information can be a user tag, and a user tag edited by user X for an account userX of user X is "food expert". For another example, a user tag edited by user X for an account userY of user Y is "movie expert".

Both the user information edited by the user and the user information edited by another user for the user may be subjective to some extent (may be inconsistent with an actual situation). This misleads other users to some extent when users interact with each other.

Continuing with the previous example, assume that historical data (e.g., network sharing data and browsing history data in Weibo and blog) corresponding to the account userX of user X does not include information related to food, in other words, the user tag "food expert" edited by user X for the account userX of user X is unreliable. When user X interacts with other users, the user tag may mislead the other users into believing that user X knows information related to food.

In view of this, in this implementation of the present application, reliability of user information is determined. Specifically, the establishing and storing a mapping relationship between a user identifier and user information includes the following: obtaining historical data corresponding to the user identifier; determining a matching degree between the user information in the mapping relationship that is to be established and the historical data based on the historical data, and using the matching degree as first reliability of the user information in the mapping relationship that is to be established; storing the first reliability of the user information in the mapping relationship that is to be established; and establishing the mapping relationship between the user information in the mapping relationship that is to be established and the user identifier in the mapping relationship that is to be established.

It can be seen that for both the user information edited by the user for the user identifier of the user, and the user information edited by another user for the user identifier of the user, the server determines a matching degree (first reliability) between user information edited by a user and historical data.

The historical data can be the network sharing data and the browsing history data described above, or can be historical consumption data, chat data, etc. This is not limited here.

In addition, the matching degree between the user information and the historical data can be calculated by using multiple different calculation methods. A relatively easy method for calculating the matching degree is used here for description, which constitutes no limitation on the present application: calculating a percentage of the user information in the historical data, and determining the matching degree between the user information and the historical data based on the frequency. For example, for user Y in the previously described example, the user tag (which is a type of user information) edited by another user for the account userY of user Y is "movie expert". Assume that the account userY is a Weibo account, historical data of the account userY can be historical Weibo data. Assume that a percentage of data related to movie in the historical Weibo data of the account userY is 95%, a matching degree between the user tag "movie expert" of the account userY and the historical data can be determined as 0.95.

A similar method is used to determine a matching degree (first reliability) between different user information and historical data for any user identifier. The server stores the first reliability of the user information in a process of establishing the mapping relationship between the user identifier and the user information.

For example, the following Table 1 shows user tags corresponding to the account userY and first reliability corresponding to each user tag that are stored on the server.

TABLE 1

| User tag | First reliability |
|---|---|
| Movie expert | 0.95 |
| Food expert | 0.17 |

After storing the first reliability of the user information, the server can determine a display form and a display state of the AR graphics in a subsequent process of generating the AR graphics data.

In the previously described content, the server determines first reliability corresponding to user information based on historical data corresponding to each user identifier stored on the server. This process can be considered as a big data verification process.

However, in actual applications, some features of a user cannot be fully reflected from historical data. Continuing with the previous example, although the user tag "food expert" edited by user X for the account userX of user X does not match the historical data, it does not mean that user X has no knowledge related to food. In other words, the historical data is only data generated after a user performs a corresponding network operation in a network environment, and does not absolutely represent a user feature or attribute.

In view of this, in this implementation of the present application, in addition to the first reliability determined based on the historical data, other reliability of the user information can be determined based on some specified operations (e.g., giving a like and making a comment) performed between users.

Specifically, the method further includes the following: determining, for each piece of stored user information, other users who perform a specified operation on the user information; determining, for each of the other users based on a level of the user, a score generated by the specified operation that is performed on the user information by the user; and determining and storing second reliability of the user information based on the score determined for each of the other users.

The specified operation includes but is not limited to following the user, making a comment, and giving a like.

The level includes but is not limited to an account level, a credit level, and an attention level (the attention level can be determined based on the number of followers, in other words, more followers indicate a higher attention level).

It can be seen from the previously described content that, if a user with a relatively high level performs operations such as giving a like or making a comment on certain user information, because the user with a relatively high level has high reliability, the user information is reliable. In actual applications, a specific value of the second reliability can be determined based on a product of a level of a user who performs the specified operation and a corresponding reliability coefficient (there is a positive correlation between the reliability coefficient and the user level in a method). This constitutes no limitation on the present application here.

In a method of this implementation of the present application, whether certain user information is reliable can be determined based on the number of other users who perform a specified operation on the user information. Continuing with the previous example, if 1000 other users perform an operation of giving a like on the user tag "movie expert" of the account userY, it can be considered that the 1000 other users accept the user tag. This method improves reliability of a user tag.

Based on the previously described content, the first reliability and the second reliability of the user information can be determined. In actual applications, corresponding user information can be obtained from all user information corresponding to a user identifier based on the two types of determined reliability. Specifically, the obtaining user information corresponding to the determined user identifier includes the following: determining total reliability of user information based on stored first reliability and second reliability of the user information, and obtaining the user information whose total reliability is not less than a predetermined reliability threshold based on the total reliability.

In this implementation of the present application, the total reliability of the user information can be determined by using a weight. Details are as follows: $R=w_1r_1+w_2r_2$. $R$ is the total reliability of the user information, $r_1$ is the first reliability of the user information, $w_1$ is a weight of the first reliability, $r_2$ is the second reliability of the user information, $w_2$ is a weight of the second reliability, and $w_1$ and $w_2$ can be adjusted as required. This constitutes no limitation on the present application here.

It is worthwhile to note in actual applications, a user identifier may have multiple pieces of user information (e.g., a user's account corresponds to a dozen or tens of user tags). If all the user information is obtained, after AR graphics data is generated, all the user information is displayed in a corresponding AR device. As such, the display is confusing because of the densely displayed information, affecting a user when the user views corresponding AR graphics. Therefore, it is inappropriate to obtain all the user information corresponding to the user identifier.

Therefore, in a method of this implementation of the present application, after the total reliability is determined, the user information can be selected based on the total reliability. For example, assume that the predetermined reliability threshold is 8, user tags whose total reliability is not less than 8 are obtained from all user tags of the account userY of user Y. As such, when an AR device subsequently displays AR graphics, user tags displayed above user Y are user tags whose total reliability is not less than 8.

In another method of this implementation of the present application, the user information corresponding to the user identifier may include different types of user information. For example, two user tags "love latte" and "financial management expert" reflect two features of a user in different scenarios. In actual applications, user information corresponding to a user identifier is usually associated with a corresponding service scenario. Continuing with the previous example, the user tag "love latte" is more suitable to be displayed in a scenario related to drink (e.g., when the user is in a coffee shop), and the user tag "financial management expert" is more suitable to be displayed in a scenario related to finance (e.g., when the user is in a bank). In other words, in a process of obtaining the user information, the user information can be selected from multiple pieces of user information corresponding to a user identifier based on a corresponding service scenario.

Specifically, the obtaining user information corresponding to the determined user identifier further includes the following: obtaining environment information, determining a service scenario based on the environment information, and obtaining the user information that matches the service scenario based on the service scenario.

The environment information includes but is not limited to network information, location information, geographical identification information, etc.

The network information can be specifically information such as an IP address and a network name corresponding to a network accessed by an AR device. The location information can be location information of the AR device. The geographical location identification information can be information that is provided by a signpost or an identification chip with a radio frequency identification (RFID) function and that is used to identify an actual place. The actual place can include a hotel, a company, a shopping mall, an airport, etc.

A current environment of a user using the AR device, and an environment of a user captured by the AR device can be determined based on the previously described environment information, so as to obtain the corresponding user information based on the two environments.

For example, in a coffee shop, employee M uses AR glasses, and the AR glasses capture a real-scene image in the coffee shop in real time. Assume that the AR glasses are connected to a corresponding server through a wireless network, and the server determines that an actual place where the AR glasses are located is a coffee shop based on a geographical identification chip that has an RFID function in the coffee shop.

Figure 4A:
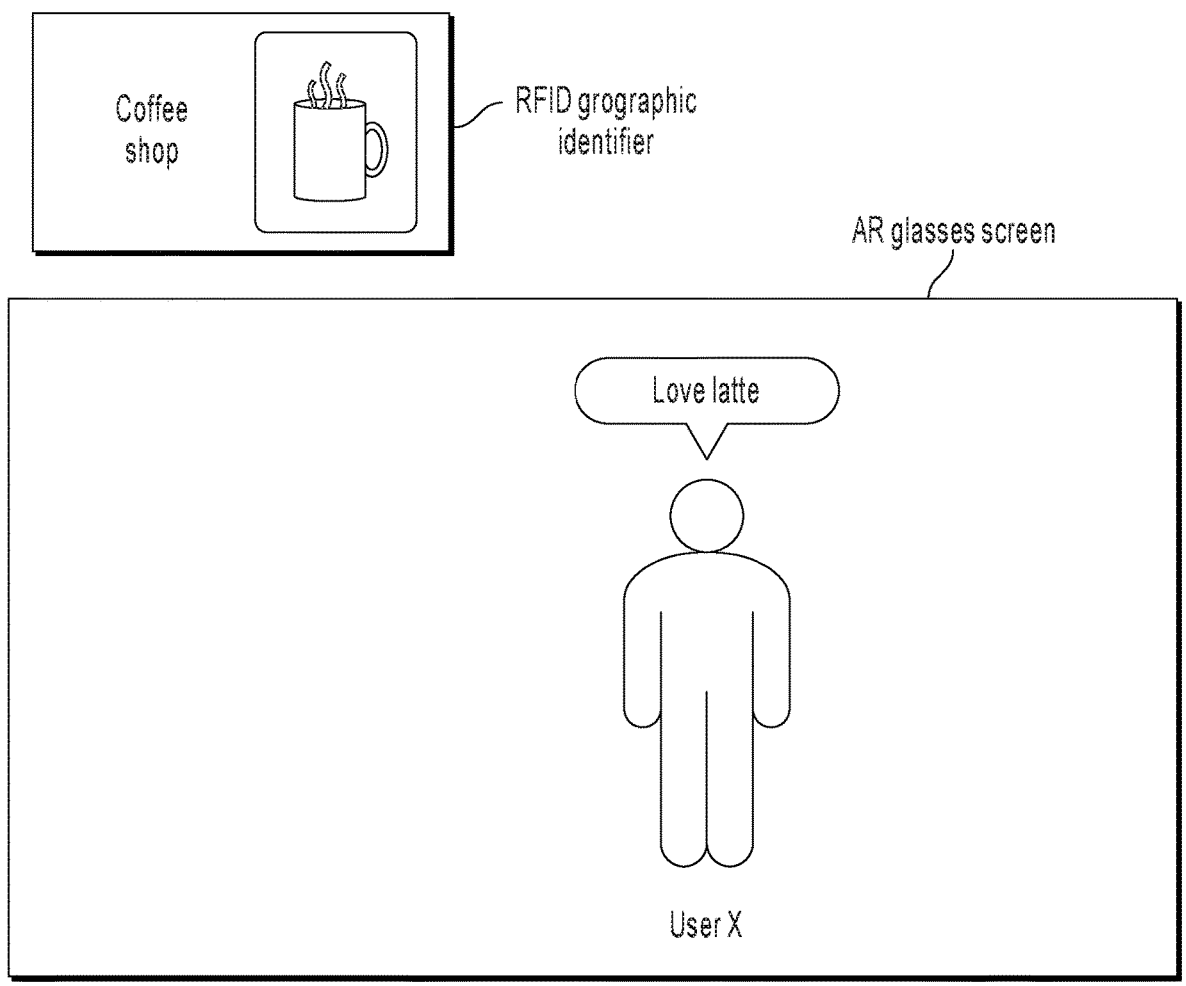
FIG. 4a and FIG. 4b are respectively schematic diagrams illustrating an AR glasses screen in different interaction scenarios, according to an implementation of the present application.

In this case, when user X walks into the coffee shop, the AR glasses capture a user image of user X and send the user image to the server, so that the server determines all user tags of user X. Because the server knows that the actual place where the AR device is located is a coffee shop, the server selects a user tag of a service scenario related to the coffee shop from all the user tags of user X. Assume that one user tag of user X is "love latte". The server obtains the user tag "love latte", generates corresponding AR graphics data based on the user tag, and sends the AR graphics data to the AR glasses. As shown in FIG. 4a, user X and AR graphics of the user tag "love latte" are displayed on the AR glasses. Therefore, employee M can intuitively learn of a preference of user X for coffee.

In addition, if other users in the coffee shop also use AR devices, AR graphics similar to FIG. 4a are also displayed in the AR devices used by these users.

Figure 4B:
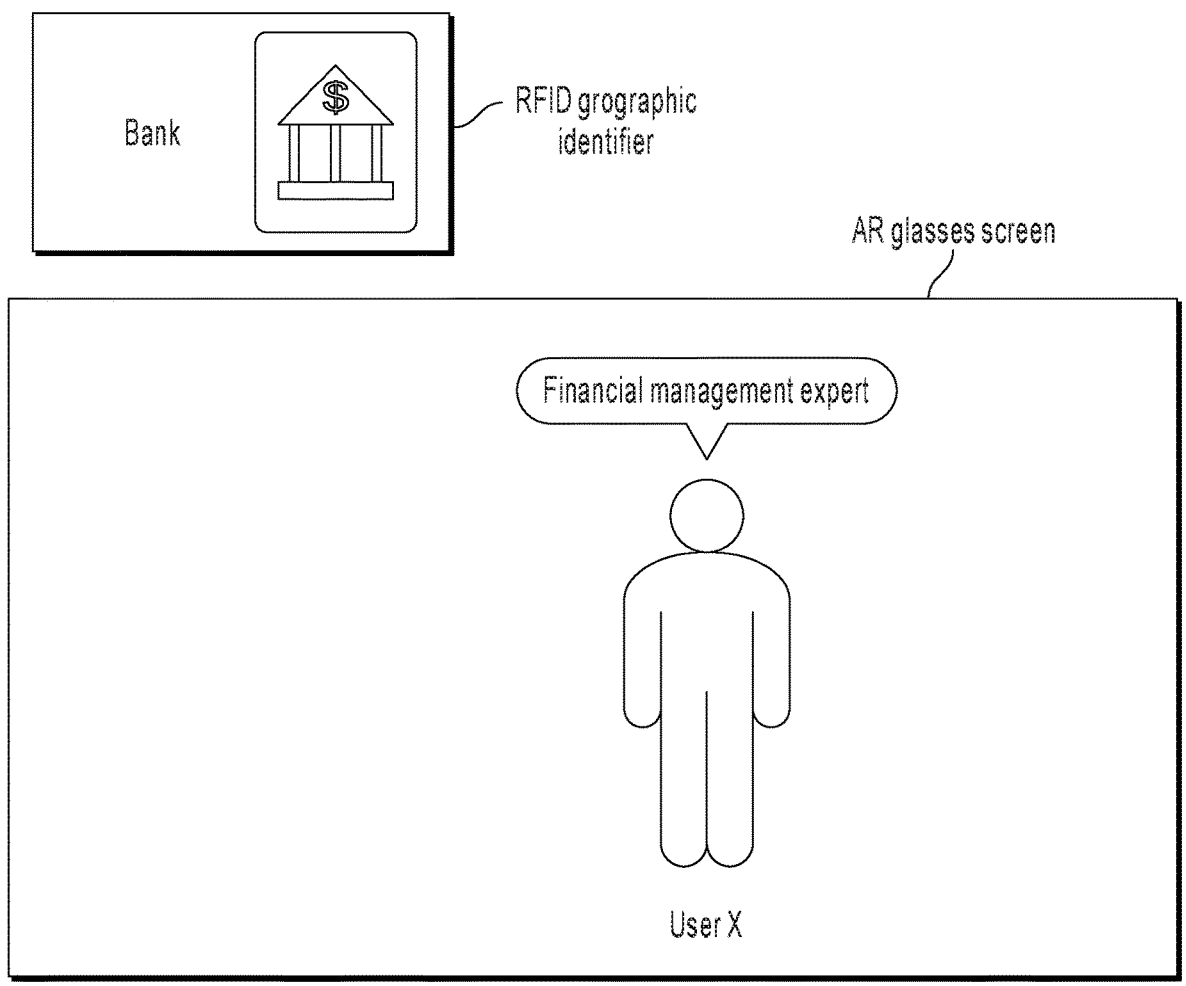

Similarly, assume that employee N uses AR glasses in a bank, and the bank has a similar RFID geographic identifier, a server can determine that an actual place where the AR glasses are located is a bank through the RFID geographic identifier. Assume that user X walks into the bank, the AR glasses used by employee N capture a user image of user X, and determine a user tag of a financial service scenario related to the bank from all user tags corresponding to user X. Assume that one user tag of user X is "financial management expert", the server obtains the user tag and generates corresponding AR graphics data based on the user tag. As shown in FIG. 4b, user X and AR graphics of the user tag "financial management expert" are displayed on the AR glasses. Therefore, employee N can intuitively learn of a feature of user X for a financial service, and can subsequently recommend a corresponding financial product to user X.

It can be seen from the previously described two examples that the server can determine different service scenarios based on different locations of AR devices or different actual places where the AR devices are located (different environment information), to obtain user information that satisfies the service scenario from user information corresponding to a user image captured by the AR device. In this method, the AR device is more intelligent to display AR graphics of user information.

In actual applications, the previously described two methods for obtaining the user information corresponding to the user identifier (one method is obtaining the user information corresponding to the user identifier based on the total reliability of the user information, and the other method is determining the corresponding service scenario based on the environment information) can be used separately, or can be used in combination. When the two methods are used in combination, the user information that matches the environment information and whose total reliability is not less than the predetermined reliability threshold can be obtained in actual applications. As such, more accurate user information can be obtained. This constitutes no limitation on the present application here.

In addition, any user can edit corresponding user information for another user, and can accept user information edited by another user for the user. In other words, the first user edits the corresponding user information for the second user. In this case, the method further includes the following: determining a user identifier corresponding to the first user, and recording and storing an editing relationship between the user information edited by the first user and the user identifier of the first user.

In other words, when users edit user information for each other, the server records a user who edits certain user information. In view of this, if the image is captured in real time and sent by an end device of the first user, the obtaining user information corresponding to the determined user identifier specifically includes the following: determining user information corresponding to the user identifier of the second user, and obtaining the user information that has the editing relationship with the user identifier of the first user from the user information corresponding to the user identifier of the second user.

For example, for a coffee shop, corresponding user tags are edited for different customers based on consumption habits of the different customers. Assume that user tags edited for user Y are "love latte" and "no need to heat the coffee", and an editing relationship is stored on a server.

Assume that user Y walks into the coffee shop and employee M of the coffee shop is using AR glasses at a certain moment. In this case, the AR glasses capture a user image of user Y, and send the captured image to the server through a network connection between the AR glasses and the server. The server determines that the user image is user Y, and obtains the user tags "love latte" and "no need to heat the coffee" based on the stored editing relationship.

In other words, even though user Y has multiple user tags, and some user tags may be edited by employees of other coffee shops, the server obtains only the two user tags edited by the coffee shop where employee M works.

Figure 5:
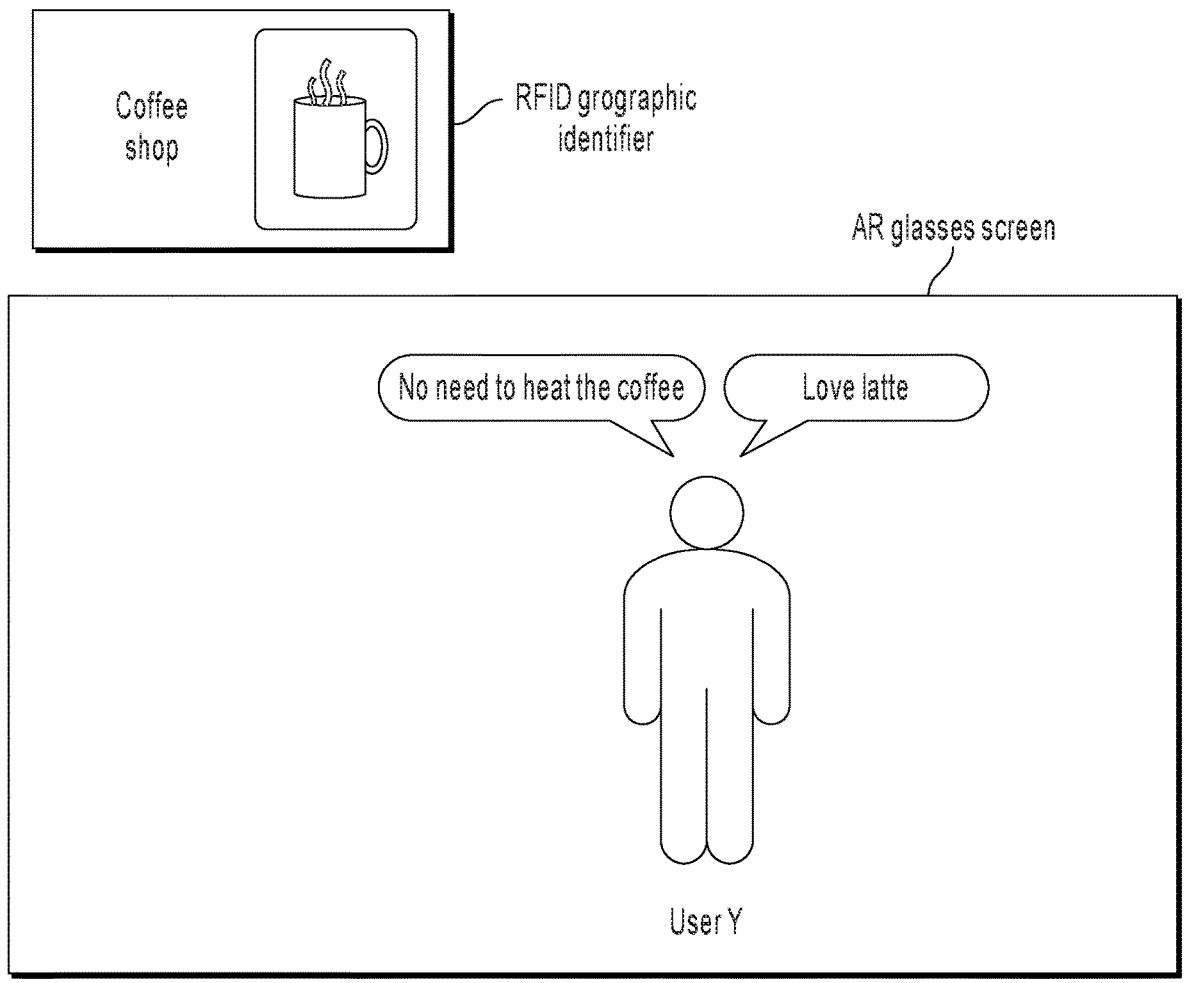
FIG. 5 is a schematic diagram illustrating an AR glasses screen in another scenario, according to an implementation of the present application.

Therefore, as shown in FIG. 5, the two user tags "love latte" and "no need to heat the coffee" of user Y are displayed on the AR glasses used by employee M. Then, employee M can provide a corresponding service for user Y based on the two user tags.

In an additional method of this implementation of the present application, the server can adjust a display effect of the AR graphics based on the total reliability of the user information. For example, if the user information has high reliability, a text of the user information can be set to a larger size. Similarly, brightness or a color of the user information can be set. In view of this, the generating AR graphics data corresponding to the user information specifically includes the following: determining a display state parameter of the user information based on the total reliability of the user information corresponding to the user identifier, and generating the AR graphics data that includes the user information and the display state parameter of the user information based on the display state parameter.

The display state parameter includes at least one of a color parameter, a brightness parameter, and a size parameter.

The information display method on a server side provided in the implementations of the present application is described above. An implementation of the present application further provides an information display method on an end device side, and the method specifically includes the following steps.

Step 1: Capture an image in real time, and send the image to a server.

The image includes a user image, so that the server determines the user image included in the image, determines a user identifier corresponding to the user image, obtains user information corresponding to the determined user identifier based on a pre-stored mapping relationship between a user identifier and user information, generates AR graphics data corresponding to the user information based on the obtained user information, and returns the AR graphics data to an end device.

In this implementation of the present application, the end device can be a device with an image capture function. Details are described above and are omitted here.

Step 2: Receive AR graphics data that corresponds to user information and that is returned by the server.

Step 3: Display, based on the AR graphics data, corresponding AR graphics in the image that is captured in real time, where the AR graphics follow the user image in real time.

The information display method provided in the implementations of the present application is described above. Based on the same idea, an implementation of the present application further provides an information display device, as shown in FIG. 6.

Figure 6:
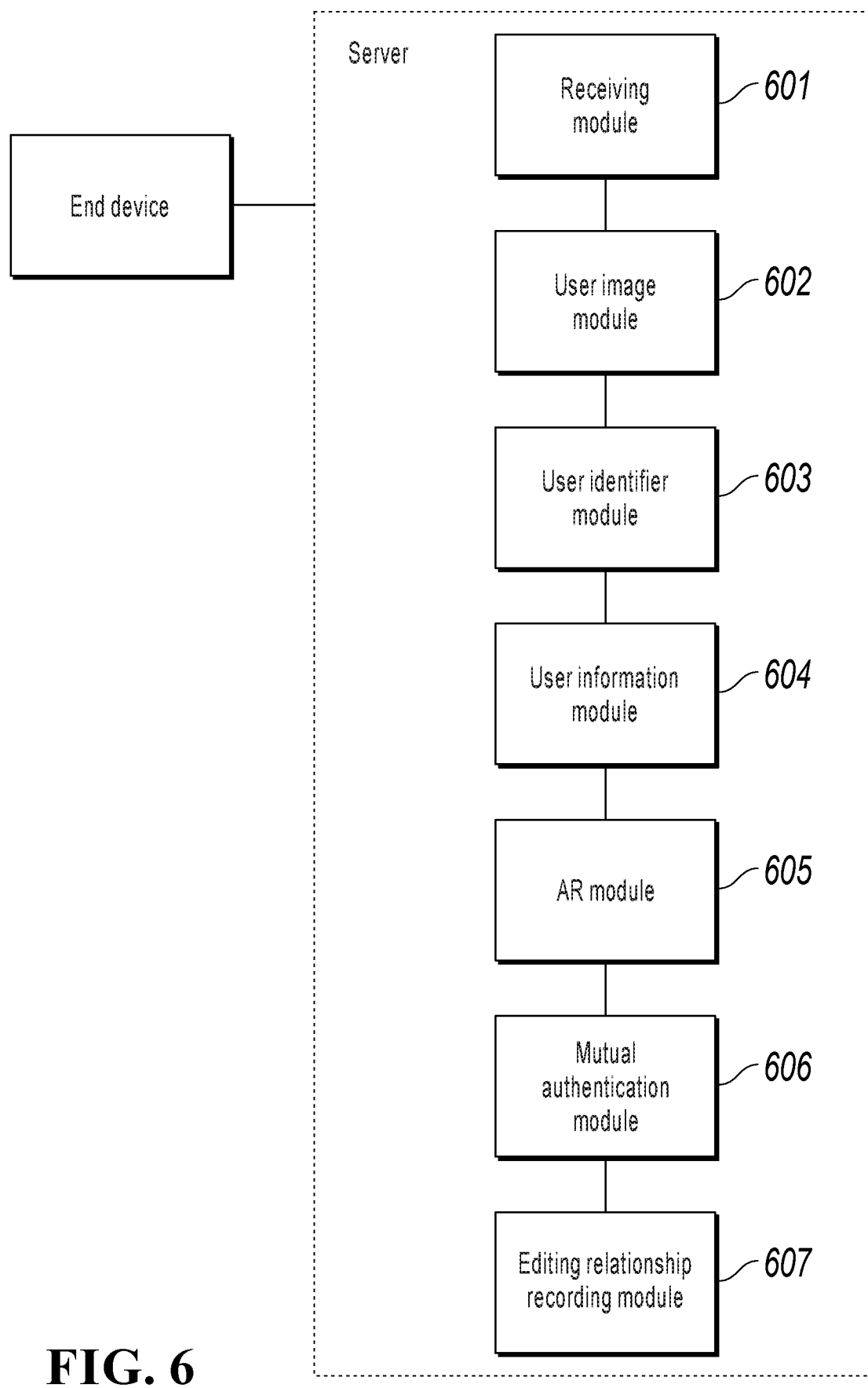
FIG. 6 is a schematic structural diagram illustrating an information display device on a server side, according to an implementation of the present application.

The information display device in FIG. 6 includes the following: a receiving module 601, configured to receive an image that is captured in real time and sent by an end device; a user image module 602, configured to determine a user image included in the image; a user identifier module 603, configured to determine a user identifier corresponding to the user image; a user information module 604, configured to obtain user information corresponding to the determined user identifier based on a pre-stored mapping relationship between a user identifier and user information; and an AR module 605, configured to generate AR graphics data corresponding to the user information based on the obtained user information, and return the AR graphics data to the end device, so that the end device displays, based on the received AR graphics data, corresponding AR graphics in the image that is captured in real time, where the AR graphics follow the user image in real time.

Specifically, the end device includes an AR device. In a method of this implementation of the present application, the AR device includes at least AR glasses, an AR helmet, a mobile phone with an AR function, a computer with an AR function, and a robot with an AR function.

The user image module 602 is specifically configured to perform character recognition on the image, to extract the user image included in the image.

The user identifier module 603 is specifically configured to extract an image feature based on the determined user image; determine a user feature that matches the extracted image feature from pre-stored user features that respectively correspond to user identifiers; and use a user identifier corresponding to the determined user feature as the user identifier corresponding to the user image.

The pre-stored user features include a biometric feature. The biometric feature includes at least one of a facial feature, a fingerprint feature, a palm print feature, a retinal feature, a human outline feature, a gait feature, and a voiceprint feature.

When the biometric feature includes the facial feature, the receiving module 601 is specifically configured to receive multiple frames of images that are captured in real time and sent by the end device.

The user identifier module 603 is specifically configured to extract a facial feature from a user image in each frame of image, construct a three-dimensional facial model based on the extracted facial features, and determine a three-dimensional facial model that matches the constructed three-dimensional facial model from pre-stored three-dimensional facial models that respectively correspond to user identifiers.

When the biometric feature includes the gait feature, the receiving module 601 is specifically configured to receive multiple frames of images that are captured in real time and sent by the end device.

The user identifier module 603 is specifically configured to extract a gait feature from a user image in each frame of image, and determine a gait feature that matches the extracted gait feature from pre-stored gait features that respectively correspond to user identifiers.

The user information module 604 is specifically configured to receive user information edited by a user for a user identifier of the user, and establish and store a mapping relationship between the user identifier and the user information based on the user information edited by the user for the user identifier of the user; or receive user information edited by a first user for a second user, and establish and store a mapping relationship between a user identifier of the second user and the user information based on the user information edited by the first user for the second user.

The user information module 604 is specifically configured to obtain historical data corresponding to the user identifier; determine a matching degree between the user information in the mapping relationship that is to be established and the historical data based on the historical data, and use the matching degree as first reliability of the user information in the mapping relationship that is to be established; store the first reliability of the user information in the mapping relationship that is to be established; and establish the mapping relationship between the user information in the mapping relationship that is to be established and the user identifier in the mapping relationship that is to be established.

The device further includes a mutual authentication module 606, configured to determine, for each piece of stored user information, other users who perform a specified operation on the user information; determine, for each of the other users based on a level of the user, a score generated by the specified operation that is performed on the user information by the user; and determine and store second reliability of the user information based on the score determined for each of the other users.

The specified operation includes at least one of following the user, making a comment, and giving a like.

The level includes at least one of an account level, a credit level, and an attention level.

The user information module 604 is specifically configured to determine total reliability of user information based on stored first reliability and second reliability of the user information, and obtain the user information whose total reliability is not less than a predetermined reliability threshold based on the total reliability.

The user information module 604 is further configured to obtain environment information, determine a service scenario based on the environment information, and obtain the user information that matches the service scenario based on the service scenario.

The environment information includes at least one of network information, location information, and geographical identification information.

The device further includes an editing relationship recording module 607, configured to determine a user identifier corresponding to the first user, and record and store an editing relationship between the user information edited by the first user and the user identifier of the first user.

When the image is captured in real time and sent by an end device of the first user, the user information module 604 is specifically configured to determine user information corresponding to the user identifier of the second user, and obtain the user information that has the editing relationship with the user identifier of the first user from the user information corresponding to the user identifier of the second user.

The AR module 605 is specifically configured to determine a display state parameter of the user information based on the total reliability of the user information corresponding to the user identifier, and generate the AR graphics data that includes the user information and the display state parameter of the user information based on the display state parameter. The display state parameter includes at least one of a color parameter, a brightness parameter, and a size parameter.

Figure 7:
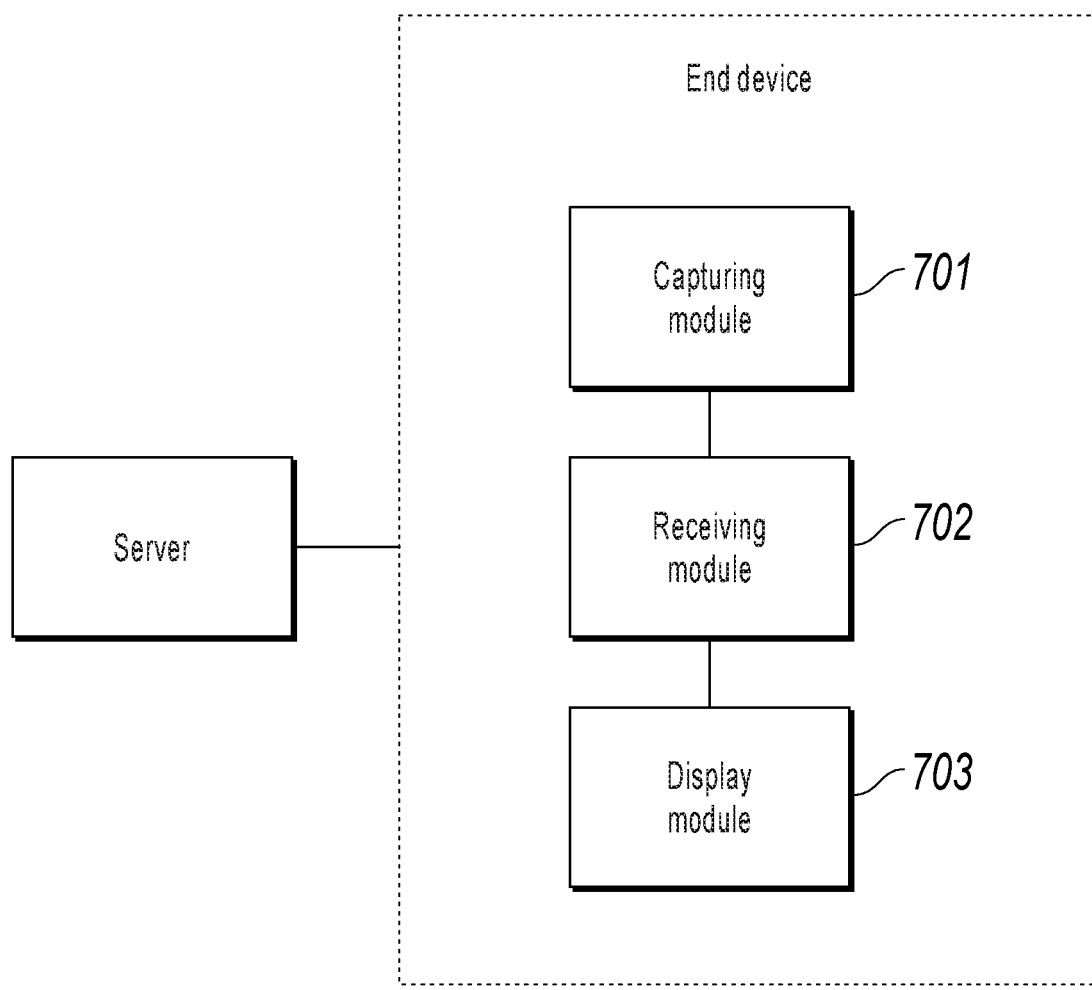
FIG. 7 is a schematic structural diagram illustrating an information display device on an end device side, according to an implementation of the present application.

Based on the same idea, an implementation of the present application further provides an information display device, as shown in FIG. 7. The device includes the following: a capturing module 701, configured to capture an image in real time, and send the image to a server, where the image includes a user image, so that the server determines the user image included in the image, determines a user identifier corresponding to the user image, obtains user information corresponding to the determined user identifier based on a pre-stored mapping relationship between a user identifier and user information, generates AR graphics data corresponding to the user information based on the obtained user information, and returns the AR graphics data to an end device; a receiving module 702, configured to receive the AR graphics data that corresponds to the user information and that is returned by the server; and a display module 703, configured to display, based on the AR graphics data, corresponding AR graphics in the image that is captured in real time, where the AR graphics follow the user image in real time.

Figure 8:
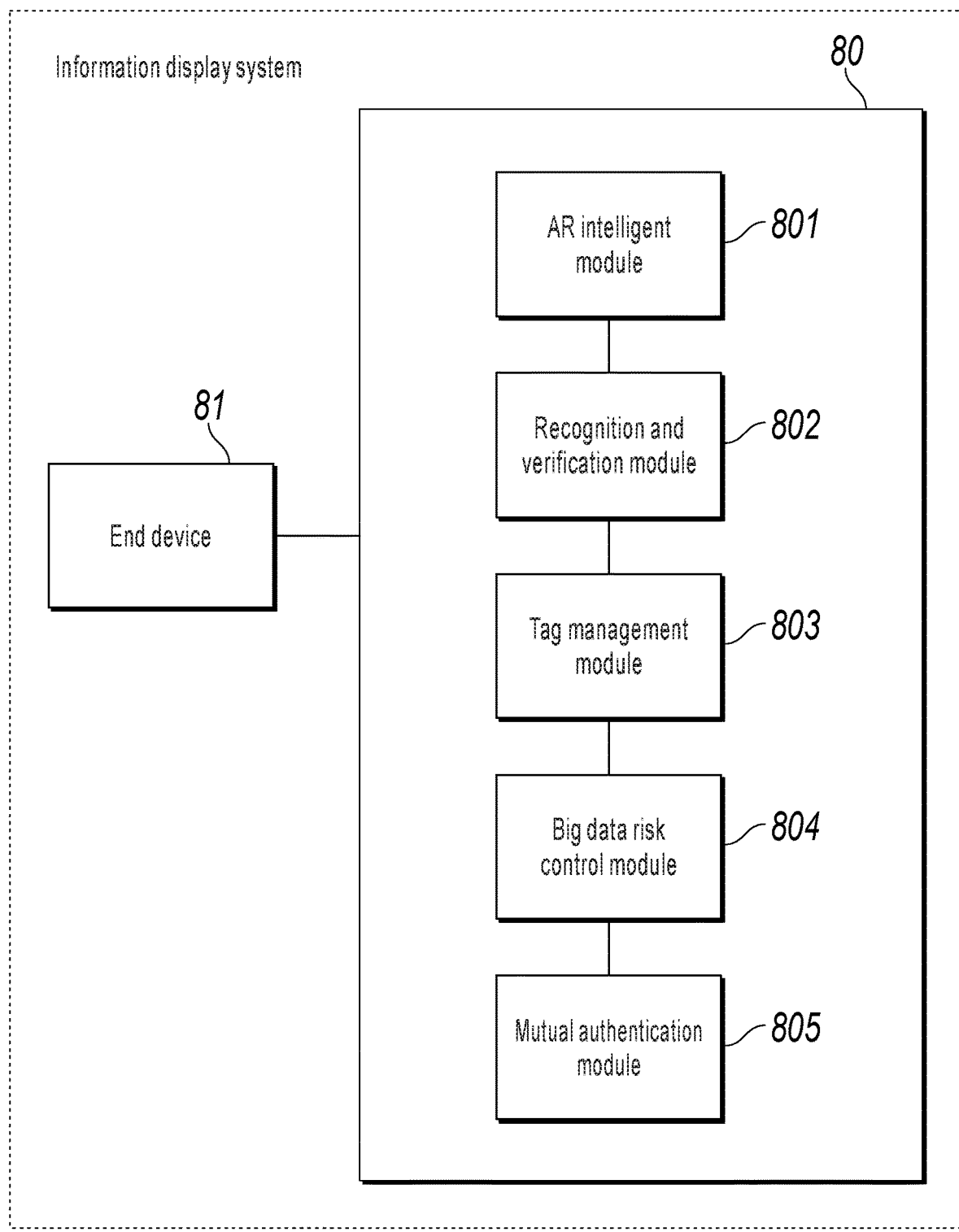
FIG. 8 is a schematic structural diagram illustrating an information display system, according to an implementation of the present application.

With reference to the previously described content, an implementation of the present application further provides an information display system, as shown in FIG. 8. The system includes an information display device 80 and an end device 81.

The end device 81 is configured to capture an image in real time, send the image to the information display device 80, and display, based on received AR graphics data that corresponds to a user image included in the image and that is returned by the information display device 80, corresponding AR graphics in the image that is captured in real time. The AR graphics follow the user image in real time.

The information display device 80 includes the following: an AR intelligent module 801, configured to receive the image that is captured by the end device in real time, and generate the AR graphics data corresponding to user information included in the image; a recognition and verification module 802, configured to determine the user image included in the image based on the received image, and determine a user identifier corresponding to the user image; a tag management module 803, configured to obtain the user information corresponding to the determined user identifier based on a pre-stored mapping relationship between a user identifier and user information; a big data risk control module 804, configured to obtain historical data corresponding to the user identifier, determine a matching degree between the user information in a mapping relationship that is to be established and the historical data based on the historical data, use the matching degree as first reliability of the user information in the mapping relationship that is to be established, store the first reliability of the user information in the mapping relationship that is to be established, and establish the mapping relationship between the user information in the mapping relationship that is to be established and the user identifier in the mapping relationship that is to be established; and a mutual authentication module 805, configured to determine, for each piece of stored user information, other users who perform a specified operation on the user information, determine, for each of the other users based on a level of the user, a score generated by the specified operation that is performed on the user information by the user, and determine and store second reliability of the user information based on the score determined for each of the other users.

In a typical configuration, a computing device includes one or more processors (CPU), an input/output interface, a network interface, and a memory.

The memory may include a form of a volatile memory, a random access memory (RAM) and/or a non-volatile memory, etc., in a computer readable medium, such as a read-only memory (ROM) or a flash memory (flash RAM). The memory is an example of the computer readable medium.

The computer readable medium includes volatile and non-volatile, removable and non-removable media, and can store information by using any method or technology. The information can be a computer readable instruction, a data structure, a program module, or other data. A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage or another magnetic storage device, or any other non-transmission medium. The computer storage medium can be used to store information that can be accessed by the computing device. As described in this specification, the computer readable medium does not include transitory media, for example, a modulated data signal and a carrier.

It should be further noted that terms "include" and "contain", or their any other variant is intended to cover non-exclusive inclusion, so that a process, a method, an article, or a device that includes a series of elements not only includes those elements, but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The previous descriptions are merely implementations of the present application, and are not intended to limit the present application. For a person skilled in the art, the present application can have various modifications and changes. Any modifications, equivalent replacements, improvements, etc. made in the spirit and principle of the present application shall fall in the scope of the claims in the present application.

Figure 9:
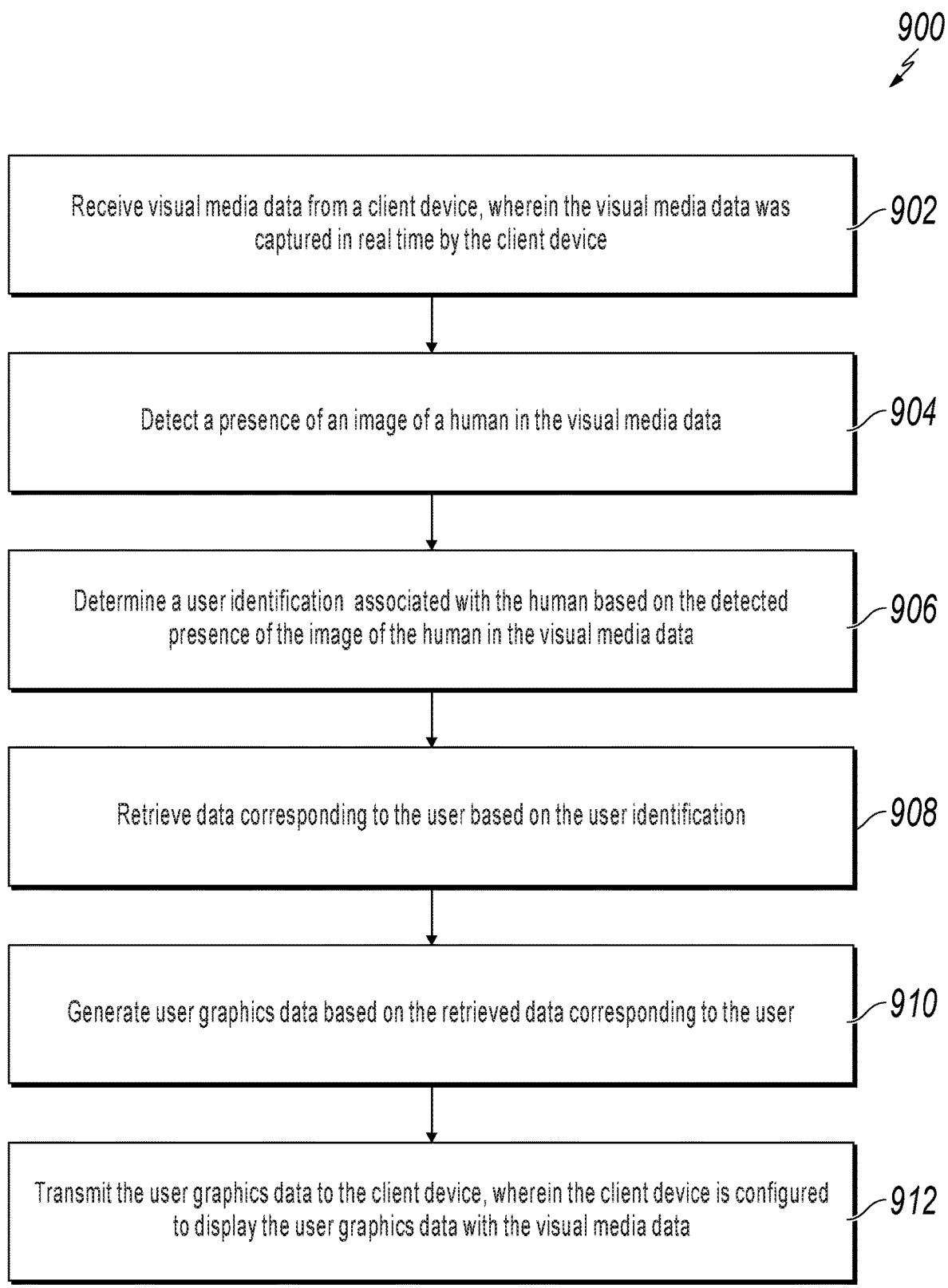
FIG. 9 is a flowchart illustrating an example of a computer-implemented method for an information display process, according to an implementation of the present disclosure.

FIG. 9 is a flowchart illustrating an example of a computer-implemented method 900 for an information display process, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a system receives visual data from a client device, wherein the visual media data was captured in real time by the client device. The client device can include an augmented reality (AR) device that uses image capture functionality. In particular, the AR device can be, for example, AR glasses, an AR helmet, a mobile phone with AR functionality, a computer with AR functionality, and a robot with AR functionality. During the capture process by the client device, the client device can capture one or images in real time using a mobile phone, a camera, a computer equipped with a camera, or a robot. The visual media data can be captured from a real-scene image or one or more consecutive images in the form of a video. The client device transmits the visual media data to a server over a network for further processing. From 902, method 900 proceeds to 904.

At 904, the system detects a presence of an image of a human in the visual media data. In response to receiving the visual media data, the server detects whether an image of a user exists in the visual media data. For example, the server detects whether a human exists in the captured media by performing one or more human character recognition algorithms on the captured media. If the character recognition algorithms detect a user in the captured media, the system extracts an image of the detected human from the visual media data. From 904, method 900 proceeds to 906.

At 906, the system determines a user identification associated with the human based on the detected presence of the image of the human in the visual media data. Using the detected presence of the image of the human, the system determines the identification of the human. The system extracts one or more features of the detected human from the extracted image. The one or more features extracted from the extracted image can include biometric features, such as a facial feature, a fingerprint feature, a palm print feature, a retinal feature, a human outline feature, a gait feature, and a voiceprint feature. The features can be extracted based on the type of features identified from the extracted image.

In some implementations, if the server extracts a facial feature from the captured media, the server proceeds to construct a three-dimensional facial model based on the extracted facial features. Additionally, the server can compare the constructed three-dimensional facial model to a plurality of three-dimensional facial models stored on the server. In particular, each stored three-dimensional facial model correspond to a user identifier.

In some implementations, if the server extracts a gait feature from the captured media, the server compares the extracted gait feature to one or more pre-stored gait features stored on the server, each of the one or more pre-stored gait features correspond to a user identifier. Once the server determines a feature extracted from the image that matches a pre-stored feature on the server, the server retries a user identifier corresponding to the pre-stored feature on the server. The user identifier can be an identity (ID) of a user, such as a name of the user, social security information of the user, or include a link to a user's corresponding social media profile. From 906, method 900 proceeds to 908.

At 908, the system retrieves data corresponding to the user based on the user identification. Once the user identification is determined, the server retrieves data corresponding to the user using a user identifier as an index. Data corresponding to the user can be indexed in memory by the user identifier. The data corresponding to the user can include a real name of the user, an account name of the user, a self-introduction of the user, comments other user have made about the particular user, a user tag (such as, a gamer tag, or a tag that reflects one or more attributes about the user). For example, the data corresponding to the user may include different types of user information For example, the data can include two user tags that recite "loves latte" and "financial management expert" that reflect two various features of the user in various scenarios. Such that, user information for a particular user identifier can correspond with a service scenario. So, the user tag "loves lattes" can be displayed in a scenario relating to drinking lattes (such as in a coffee shop), and the user tag "financial management expert" can be displayed in a scenario relating to providing financial advice (such as in a bank). This tagged information can be added to the augmented reality graphics data provided below.

In order for the server to determine which graphics to provide in the augmented reality graphics data from the data corresponding to the user, the server determines environment information, determines a service based on the environment information, and obtains the user information that matches the service scenario based on the service scenario. The environment information includes but is not limited to network information, location information, geographical identification information. The network information can be specifically information such as an IP address and a network name corresponding to a network accessed by the client device. The location information can be location information of the client device, such as GPS locational information. The geographical location identification information can be information that is provided by a signpost or an identification chip with a radio frequency identification (RFID) function and that is used to identify an actual place. The actual place can include a hotel, a company, a shopping mall, an airport, etc. From 908, method 900 proceeds to 910.

At 910, the system generates user graphics data using the retrieved data corresponding to the user. The generated user graphics data can be augmented reality graphics data that follow a user image in real time. The augmented reality graphics data corresponds to user information, such as text and one or more icons that can be displayed in two-dimensional or three-dimensional form. The augmented reality graphics data can be generated to be displayed on the client device along with the real time media recorded by the client device. In particular, the server can determine generated augmented reality graphics data from first reliability and second reliability information of the user, as described above. The server determines total reliability of the user information based on stored first reliability of the user information and the stored second reliability of the user information. Additionally, the server can adjust a display effect of the AR graphics based on the determined total reliability of the user information. The display effect can be based on a display state parameter which includes at least one of a color parameter, a brightness parameter, and a size parameter. The display state parameter can be determined based on the total reliability of the user information. From 910, method 900 proceeds to 912.

At 912, the system transmits the user graphics data to the client device, wherein the client device is configured to display the user graphics data with the visual media data. The system can transmit the generated augmented reality graphics data to the client device for displaying with the user detected in visual media captured in real time. As shown in FIGS. 2a through 2d and 4a, 4b, and 5, the generated augmented reality graphics data can appear above the tracked user in the captured media in real time. A viewer monitoring the client device can view the captured media with the generated augmented reality graphics data attached to the tracked user as shown in the aforementioned figures. After 912, method 900 stops.

The features of the present application seek to conveniently display user information that reflects a mapping relationship between user information and a user. For example, the system is configured to receive visual media data from a client device, wherein the visual media data was captured in real time by the client device; detect a presence of an image of a human in the visual media data; determine a user identification associated with the human based on the detected presence of the image of the human in the visual media data; retrieve data corresponding to the user based on the user identification; generate user graphics data based on the retrieved data corresponding to the user; and transmit the user graphics data to the client device, wherein the client device is configured to display the user graphics data with the visual media data. By performing this method, a user can view user information of other users without accessing a corresponding interface. In addition, virtual user information can be associated with an actual user by using AR graphics, and the user can view user information of other users without any operation in the whole process. In this method, the user information can be viewed more conveniently during user interaction, and a substantial association between virtual user information and an actual user is established.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving visual media data from a client device, wherein the visual media data being captured in real time by the client device;
   detecting a presence of an image of a human in the visual media data;
   determining a user identification associated with the human based on the detected presence of the image of the human in the visual media data;
   retrieving data corresponding to the user based on the user identification;
   generating user graphics data based on the retrieved data corresponding to the user by:
      determining a total reliability of the retrieved data corresponding to the user;
      generating a display state parameter based on the determined total reliability, wherein the display statement parameter comprises at least one of a color parameter, a brightness parameter, and a size parameter; and
      generating augmented reality (AR) graphics data based on the total reliability of the retrieved data retrieved corresponding to the user and the generated display state parameter, wherein the user graphics data includes the generated AR graphics data;
   transmitting the user graphics data to the client device, and
   displaying, by the client device, the visual media data and the user graphics data proximate to the image of the human in the visual media data,
   wherein the client device is configured to continue displaying in real time the user graphics data proximate to the image of the human in the visual media data as a position of the image of the human in the visual media data changes in real time.

2. The computer-implemented method of claim 1, wherein the visual media data comprises at least one of a single image frame, or multiple consecutive frames of a video.

3. The computer-implemented method of claim 2, wherein determining the identification of the user based on the detected presence of the image of the human from the visual media data further comprises:
   extracting an image feature from the extracted image of the human;

comparing the extracted image feature to each biometric feature from a plurality of pre-stored biometric features, wherein the plurality of pre-stored biometric features comprises at least one of a facial feature, a fingerprint feature, a palm print feature, a retinal feature, a human outline feature, a gait feature, and a voiceprint feature; and in response to determining the extracted image feature matches the biometric feature, retrieving a user identifier that corresponds to the matching biometric feature.

4. The computer-implemented method of claim 1, wherein detecting the presence of the image of a human in the visual media data further comprises:

detecting the image of a human in the visual media data using a human character recognition algorithm; and extracting the detected image of the human from the visual media data.

5. The computer-implemented method of claim 1, wherein retrieving the data corresponding to the user based on the user identification further comprises:

obtaining environment information from the visual media data;

determining a service scenario based on the obtained environment information; and retrieving the data corresponding to the user that matches the service scenario based on the obtained environment information.

6. The computer-implemented method of claim 5, wherein the environment information comprises network information, location information, and geographical identification information.

7. The computer-implemented method of claim 1, wherein the generated AR graphics data is configured to be displayed at a location of an image of the user within a current frame of the visual media data when the visual media data is displayed by the client device.

8. A non-transitory, computer-readable medium storing one or more instructions executable by a computer system to perform operations comprising:

receiving visual media data from a client device, wherein the visual media data being captured in real time by the client device;

detecting a presence of an image of a human in the visual media data;

determining a user identification associated with the human based on the detected presence of the image of the human in the visual media data;

retrieving data corresponding to the user based on the user identification;

generating user graphics data based on the retrieved data corresponding to the user by:

determining a total reliability of the retrieved data corresponding to the user;

generating a display state parameter based on the determined total reliability, wherein the display statement parameter comprises at least one of a color parameter, a brightness parameter, and a size parameter; and generating augmented reality (AR) graphics data based on the total reliability of the retrieved data retrieved corresponding to the user and the generated display state parameter, wherein the user graphics data includes the generated AR graphics data;

transmitting the user graphics data to the client device, and displaying, by the client device, the visual media data and the user graphics data proximate to the image of the human in the visual media data, wherein the client device is configured to continue displaying in real time the user graphics data proximate to the image of the human in the visual media data as a position of the image of the human in the visual media data changes in real time.

9. The non-transitory, computer-readable medium of claim 8, wherein the visual media data comprises at least one of a single image frame, or multiple consecutive frames of a video.

10. The non-transitory, computer-readable medium of claim 9, wherein determining the identification of the user based on the detected presence of the image of the human from the visual media data further comprises:

extracting an image feature from the extracted image of the human;

comparing the extracted image feature to each biometric feature from a plurality of pre-stored biometric features, wherein the plurality of pre-stored biometric features comprises at least one of a facial feature, a fingerprint feature, a palm print feature, a retinal feature, a human outline feature, a gait feature, and a voiceprint feature; and in response to determining the extracted image feature matches the biometric feature, retrieving a user identifier that corresponds to the matching biometric feature.

11. The non-transitory, computer-readable medium of claim 8, wherein detecting the presence of the image of a human in the visual media data further comprises:

detecting the image of a human in the visual media data using a human character recognition algorithm; and extracting the detected image of the human from the visual media data.

12. The non-transitory, computer-readable medium of claim 8, wherein retrieving the data corresponding to the user based on the user identification further comprises:

obtaining environment information from the visual media data;

determining a service scenario based on the obtained environment information; and retrieving the data corresponding to the user that matches the service scenario based on the obtained environment information.

13. The non-transitory, computer-readable medium of claim 12, wherein the environment information comprises network information, location information, and geographical identification information.

14. The non-transitory, computer-readable medium of claim 8, wherein the generated AR graphics data is configured to be displayed at a location of an image of the user within a current frame of the visual media data when the visual media data is displayed by the client device.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving visual media data from a client device, wherein the visual media data being captured in real time by the client device;

detecting a presence of an image of a human in the visual media data;

determining a user identification associated with the human based on the detected presence of the image of the human in the visual media data;

retrieving data corresponding to the user based on the user identification;

generating user graphics data based on the retrieved data corresponding to the user by:
- determining a total reliability of the retrieved data corresponding to the user;
- generating a display state parameter based on the determined total reliability, wherein the display statement parameter comprises at least one of a color parameter, a brightness parameter, and a size parameter; and
- generating augmented reality (AR) graphics data based on the total reliability of the retrieved data retrieved corresponding to the user and the generated display state parameter, wherein the user graphics data includes the generated AR graphics data;

transmitting the user graphics data to the client device, and displaying, by the client device, the visual media data and the user graphics data proximate to the image of the human in the visual media data, wherein the client device is configured to continue displaying in real time the user graphics data proximate to the image of the human in the visual media data as a position of the image of the human in the visual media data changes in real time.

16. The computer-implemented system of claim 15, wherein the visual media data comprises at least one of a single image frame, or multiple consecutive frames of a video.

17. The computer-implemented system of claim 15, wherein detecting the presence of the image of a human in the visual media data further comprises:
- detecting the image of a human in the visual media data using a human character recognition algorithm; and
- extracting the detected image of the human from the visual media data.

18. The computer-implemented system of claim 16, wherein determining the identification of the user based on the detected presence of the image of the human from the visual media data further comprises:
- extracting an image feature from the extracted image of the human;
- comparing the extracted image feature to each biometric feature from a plurality of pre-stored biometric features, wherein the plurality of pre-stored biometric features comprises at least one of a facial feature, a fingerprint feature, a palm print feature, a retinal feature, a human outline feature, a gait feature, and a voiceprint feature; and
- in response to determining the extracted image feature matches the biometric feature, retrieving a user identifier that corresponds to the matching biometric feature.

* * * * *